United States Patent
LaVeigne et al.

(10) Patent No.: US 12,474,218 B2
(45) Date of Patent: Nov. 18, 2025

(54) RADIOMETRIC PERFORMANCE ENHANCEMENT OF EXTENDED AREA BLACKBODIES

(71) Applicants: Joseph D LaVeigne, Buellton, CA (US); Gregory P Matis, Santa Barbara, CA (US); Albert Gibson, Santa Barbara, CA (US); Nathan Radtke, Santa Barbara, CA (US); Vincent Posner, Santa Barbara, CA (US)

(72) Inventors: Joseph D LaVeigne, Buellton, CA (US); Gregory P Matis, Santa Barbara, CA (US); Albert Gibson, Santa Barbara, CA (US); Nathan Radtke, Santa Barbara, CA (US); Vincent Posner, Santa Barbara, CA (US)

(73) Assignee: Santa Barbara Infrared, Inc., Santa Barbara, CA (US)

(*) Notice: Subject to any disclaimer, the term of this patent is extended or adjusted under 35 U.S.C. 154(b) by 47 days.

(21) Appl. No.: 18/211,261

(22) Filed: Jun. 17, 2023

(65) Prior Publication Data
US 2023/0408341 A1 Dec. 21, 2023

Related U.S. Application Data

(63) Continuation of application No. 17/073,351, filed on Oct. 18, 2020, now abandoned.
(Continued)

(51) Int. Cl.
*G01J 5/53* (2022.01)
*G01J 5/06* (2022.01)
(Continued)

(52) U.S. Cl.
CPC ............ *G01J 5/53* (2022.01); *G01J 5/061* (2013.01); *G01J 5/064* (2022.01);
(Continued)

(58) Field of Classification Search
None
See application file for complete search history.

(56) References Cited

U.S. PATENT DOCUMENTS 5,265,958 A    11/1993   Ludlow
5,594,832 A *   1/1997   Obermeier ............... H01K 7/00
                                                     392/435
(Continued)

FOREIGN PATENT DOCUMENTS

CN    209017341 U  *  6/2019
CN    113984219 A  *  1/2022
(Continued)

OTHER PUBLICATIONS

Blackbody radiators for field calibration, Cross et al, Proceedings of SPIE, vol. 1540, Dec. 1, 1991 (8 pages).
(Continued)

*Primary Examiner* — Marcus H Taningco
(74) *Attorney, Agent, or Firm* — Gerald E Linden

(57) ABSTRACT

An extended area "cavity type" blackbody for use as a radiometric reference for imaging systems may have a well in the form of a cube having four sidewalls and a back wall, and open at the front. The temperature of the back wall may be controlled independently of the temperature(s) of the sidewalls. This system may produce infrared radiance closer to an ideal radiator than typical extended area sources. A "simple" blackbody is disclosed, having a source plate with a front emitting surface; a ledge element disposed in front of and below the source plate for heating air in front of the source plate; and (optionally) another ledge element dis-
(Continued)

posed in front of and above the source plate for cooling air in front of the source plate. A housing may support the source plate and ledge element, and a vent may be provided in front of and above the source plate. A resistive heater may be associated with the ledge element; and (optionally) TECs may be associated with the other (cooling) ledge element. Angles of the ledges may be adjustable to optimize the best uniformity for a particular implementation. Temperature control of the ledges may be in unison with or independent from the source plate.

14 Claims, 3 Drawing Sheets

Related U.S. Application Data

(60) Provisional application No. 63/012,934, filed on Apr. 21, 2020, provisional application No. 62/916,809, filed on Oct. 18, 2019.

(51) Int. Cl.
*G01J 5/061* (2022.01)
*G01J 5/80* (2022.01)

(52) U.S. Cl.
CPC ... *G01J 2005/062* (2013.01); *G01J 2005/063* (2013.01); *G01J 5/80* (2022.01)

(56) References Cited

U.S. PATENT DOCUMENTS

| | | | | |
|---|---|---|---|---|
| 6,232,614 | B1 * | 5/2001 | Christy | G01J 5/53 250/338.5 |
| 7,340,293 | B2 * | 3/2008 | McQuilkin | G01J 5/53 374/129 |
| 9,933,311 | B2 | 4/2018 | LaVeigne et al. | |
| 2012/0073308 | A1 * | 3/2012 | Kim | G05D 23/27 62/3.2 |
| 2019/0212203 | A1 | 7/2019 | Wei et al. | |

FOREIGN PATENT DOCUMENTS

| | | | |
|---|---|---|---|
| CN | 114812829 A | * | 7/2022 |
| CN | 218381309 U | * | 1/2023 |
| KR | 881713 B1 | * | 2/2009 |

OTHER PUBLICATIONS

Variable Temperature Blackbody Sources as Primary Standards, Keikhosrow Irani, Mikron Infrared Inc. (20 pages).
Black gold Deposits as Absorbers for Far Infrared Radiation, Becker et al., Institute für Angewandte Physik, phys. stat. sol. (b) 194, 241, 1996 (15 pages).
Plasmonic blackbody: Strong absorption of light by metal nanoparticles embedded in a dielectric matrix, Kravets et al., school of Physics and Astronomy, University of Manchester, Physical Review B 81, 165401, 2010 (9 pages).

* cited by examiner side (and back) walls

"simple" blackbody, with vent

RADIOMETRIC PERFORMANCE ENHANCEMENT OF EXTENDED AREA BLACKBODIES

CROSS-REFERENCE TO RELATED APPLICATION(S)

This is a continuation of U.S. Pat. No. 17,073,351 filed 18 Oct. 2020, which is:
 a nonprovisional of 63/012,934 filed 21 Apr. 2020
 a nonprovisional of 62/916,809 filed 18 Oct. 2019

BACKGROUND

Blackbody radiation is the thermal electromagnetic radiation within or surrounding a body in thermodynamic equilibrium with its environment, emitted by a black body (an idealized opaque, non-reflective body). It has a specific spectrum of wavelengths, inversely related to intensity that depend only on the body's temperature, which is assumed for the sake of calculations and theory to be uniform and constant A black body (or blackbody) is an idealized physical body that absorbs all incident electromagnetic radiation, regardless of frequency or angle of incidence. A black body in thermal equilibrium (that is, at a constant temperature) emits electromagnetic radiation called blackbody radiation. The radiation is emitted according to Planck's law, meaning that it has a spectrum that is determined by the temperature alone, not by the body's shape or composition. A black body in thermal equilibrium has two notable properties:

It is an ideal emitter: it emits as much or more energy at every frequency than any other body at the same temperature.
 It is a diffuse emitter: the energy is radiated isotropically, independent of direction.

An approximate realization of a black surface is a hole in the wall of a large enclosure. Any light entering the hole is reflected indefinitely or absorbed inside and is unlikely to re-emerge, making the hole a nearly perfect absorber. The radiation confined in such an enclosure may or may not be in thermal equilibrium, depending upon the nature of the walls and the other contents of the enclosure.

Extended Area Blackbodies

Extended area blackbodies are commonly used for testing infrared cameras and other thermal detection devices. Blackbodies are used as thermal sources to provide a desired radiance or apparent temperature to a device under test or to illuminate a target with a known radiance or apparent temperature or to provide a desired temperature difference between the features in a target.

Typically, the differential temperature between the regions of the target is of more interest than the absolute radiance. Extended area blackbodies are also commonly used as references when performing nonuniformity correction on infrared imagers. In this use case, the source is most commonly placed out of focus, near the entrance aperture of the imager lens such that small variation in the plate will be sufficiently out of focus and not affect the nonuniformity correction. In these cases, similar to the target projector case, the accuracy of the absolute radiance is of secondary importance. The desired function is to provide a uniform radiance source that is close enough to the desired NUC point that effective nonuniformity correction coefficient can be derived. For typical IR imagers viewing terrestrial scenes, this can be accomplished even if the apparent temperature of the uniform source differs from the ideal temperature by a degree or more.

Extended area blackbodies usually comprise a conductive plate with a temperature sensor and a thermal source of some type. A common configuration is a copper or aluminum plate heated or cooled with thermoelectric modules using a sensor in a well in the plate as feedback for the control loop. Another common configuration is a heat-only system that uses resistive heaters in place of the thermoelectric modules. In most cases, the surface of the plate is covered with a high emissivity coating.

Extended area blackbodies are more difficult to use as absolute references than cavity blackbodies described below. This is because the radiance of the extended area source is not just a function of the temperature in the well where the control probe is located. Two major influences affect the radiance of the source plate surface. One is the emissivity of the coating. The best paints have an emissivity between 95 and 98%, causing a loss of a few percent in radiance. In addition to the emissivity, there is typically a thermal gradient between the surface and well where the temperature is measured. This gradient is commonly on the order of 1% of the temperature difference between the air temperature of the local environment and the temperature of the well, though for some coatings that use structure to increase their effective emissivity the gradient may be larger.

Cavity with a Hole

A widely used model of a blackbody surface is a small hole in a cavity with walls that are opaque to radiation. Radiation incident on the hole will pass into the cavity, and is very unlikely to be re-emitted if the cavity is large. The hole is not quite a perfect black surface—in particular, if the wavelength of the incident radiation is greater than the diameter of the hole, part will be reflected. Similarly, even in perfect thermal equilibrium, the radiation inside a finite-sized cavity will not have an ideal Planck spectrum for wavelengths comparable to or larger than the size of the cavity.

Suppose the cavity is held at a fixed temperature T and the radiation trapped inside the enclosure is at thermal equilibrium with the enclosure. The hole in the enclosure will allow some radiation to escape. If the hole is small, radiation passing in and out of the hole has negligible effect upon the equilibrium of the radiation inside the cavity. This escaping radiation will approximate blackbody radiation that exhibits a distribution in energy characteristic of the temperature T and does not depend upon the properties of the cavity or the hole, at least for wavelengths smaller than the size of the hole.

Cavity Blackbodies

True cavities with a large volume and a small hole are inconvenient to manufacture and use. A more common approach is to form an inverted cone with a depth several times larger than the opening. Blackbody radiation from the cone will reflect off the surface many times before exiting the cone, thus increasing the effective emissivity of the cone and bringing it close to unity. The deep conical shape also prevents significant convection losses from the cone surface.

Most cavities of the prior art are small (1-2" diameters are common), and long. Larger cavities are often placed in a water bath to keep them at a uniform temperature. Thus, people usually have to choose between a small area or a very slow blackbody, and sometimes both.

The most common shape for prior art cavities is a cone or some derivative thereof. Flat plates are not popular for use as an absolute radiometric reference because you can get specular reflection off the surface and most surfaces have higher reflectance (2-3% for common coatings used in blackbodies). Carbon nanotubes being somewhat of an exception with reflectance typically less than 1%.

Improved Extended Area Blackbody

The extended area blackbody described herein (below) offers a wide area (prototype is a cube, a bit over 4" on a side, and can go larger), and fast response times, comparable to those of typical extended area blackbodies, while retaining a high enough emissivity and limited interaction with the environment so that it can be used for a radiometric reference. This is accomplished by the addition of various features to help reduce radiative and/or convective losses from the extended area surface such that the surface temperature is closer to the well temperature and the emissivity approaches unity. These features may also improve uniformity by reducing the convective losses on the source plate, particularly the losses along the edges of the source plate.

The extended area blackbody described herein (below) could be any shape, though flat surfaces on the outside may be preferred to interface with the thermoelectric coolers used for temperature control.

Reference may be made to U.S. Pat. No. 9,933,311 (2018-04-03), IMPROVED BLACKBODY FUNCTION, which discloses a blackbody radiometric reference comprising a source plate or a target plate, metallic nanoparticles or other high emissivity coating disposed on the plate, and an intermediate coating such as paint. The plate may comprise copper, aluminum or composites thereof. Apparatus capable of functioning as a radiometric or thermometric reference. A pre-heater or weakly-coupled area may be disposed around or adjacent a highly thermally uniform area. A groove or perforations extending into a front surface of the source plate defining a weakly-coupled edge portion surrounding a thermally-controlled, optically-active area, and connected by bridges or structures thereto. An external probe may be located near the source plate for measuring ambient temperature, for compensating for ambient temperature or for radiative load on the blackbody.

SUMMARY

It is an object of the invention to provide an improved blackbody, more particularly, an extended area radiometric reference blackbody, more particularly an extended area blackbody with features to improve radiometric performance.

The extended area blackbody disclosed herein may have some similarities to a cavity blackbody, such as a recessed surface. However, unlike a traditional cavity, the aperture of the extended area blackbody is comparable to its overall size and the surface may be normal to the viewing angle. Also, the depth of the improved blackbody may be comparable to or less than the size of the aperture.

According to the invention, generally, an extended area blackbody for use as a radiometric reference for imaging systems may have a well in the form of a cube (or other multi-sided prismatic shape) having four sidewalls and a back wall, and open at the front (no front wall). The temperature of the back wall may be controlled independently of the temperature(s) of the sidewalls. This system may produce infrared radiance closer to an ideal radiator than typical extended area sources.

The extended area blackbody disclosed herein may comprise: a source plate having a front emitting surface; a ledge element disposed in front of and below the source plate for heating air in front of the source plate; and (optionally) another ledge element disposed in front of and above the source plate for cooling air in front of the source plate. A resistive heater may be associated with the ledge element; and (optionally) TECs may be associated with the other (cooling) ledge element. Angles of the ledges may be adjustable to optimize the best uniformity for a particular implementation. Temperature control of the ledges may be in unison with or independent from the source plate.

According to some embodiments (examples) of the invention, an improved extended area blackbody may comprise: an enclosure having a number (n) of sidewalls and a rear wall, wherein the sidewalls and rear wall are formed of a thermally conductive material, such as copper or aluminum, and a front of the enclosure is open or has an opening for infrared radiation to exit the cavity.

A coating with a high emissivity material, such as carbon nanotubes (CNT) or paint may be disposed on an interior surface of the sidewalls. A coating with a high emissivity material, such as carbon nanotubes or paint may be disposed on the interior surface of the back wall.

The number (n) of sidewalls for the enclosure may be at least 3. The number of sidewalls may be 4, or more than 4. The sidewalls may be flat. The enclosure may be in the form of a cube, with the four sidewalls and the back wall having substantially the same dimension as each other. At least some of the back wall and sidewalls may measure approximately 4"×4". The enclosure may be in the form of a rectangular prism. In a non-cube geometry, the sidewalls may have substantially the same dimension as each other, and the back wall may be larger or smaller than the sidewalls. For example, the sidewalls may measure approximately 4"×4"; and the back wall may measure approximately 4"×8".

Thermoelectric modules (TEM) or resistive heaters may be mounted to (associated with) at least some of the sidewalls, and to the rear wall. The temperature of the side walls may be controlled separately controlled from the temperature of the back wall.

According to some embodiments (examples) of the invention, an improved extended area blackbody may comprise: a source plate having a front emitting surface; and a bottom ledge element disposed in front of and below the source plate for heating air in front of the source plate.

A TEC or a resistive heater may be associated with the bottom ledge element. A top ledge element may be disposed in front of and above the source plate for cooling air in front of the source plate. A TEC may be associated with the top ledge element.

An angle of the top (cooler) ledge element may be adjustable to optimize the best uniformity for a particular implementation. Similarly, an angle of the bottom (heater) ledge element may be adjustable to optimize the best uniformity for a particular implementation. The bottom (heater) ledge element heater may or may not be separately controlled from the source plate. For very large temperature ranges, the ledges may have independent temperature control from the emissive surface (source plate).

A housing may support the source plate and bottom ledge element. A vent may be disposed in the housing at the top of the source plate to prevent hot air from pooling there (allow hot air to escape through the vent).

According to an embodiment of the invention (FIGS. 1, 2), an improved extended area blackbody may be in the form an open enclosure (box), such as a cube, with its side walls (shown as the left, right, top and bottom walls in the figures) being controlled separately from the back wall.

The back wall (opposite the open end) of the cube may be coated with carbon nanotubes to achieve a near-ideal surface emissivity (reflectance<1%).

The side walls may be painted black (this may be done for cost reasons, CNTs could be used there as well if desired, though are typically more expensive than paint) and may be set at the same temperature as the back wall, which serves two purposes.

First, the side walls limit the how much of the surrounding area the back wall "sees", while also radiating the same temperature onto the back plate (wall), thus increasing the effective emissivity.

A second, and more important effect, is that the side walls help control the air temperature in contact with the surface of the back wall. This causes the surface of the BB to be nearly the same temperature as the probe well in the plate where temperature measurement is used for the control loop.

The source plate, which is controlled, provides the substrate for the paint and provides a uniform temperature. The plate is the element that is heated by the thermoelectric modules (TEM's, or TEC's). A probe may be used to measure the temperature of the plate.

The walls, particularly the back wall functioning as a source plate, may comprise (be formed of) a thermally conductive material, such as copper, aluminum, or composite materials, such as a metal-infused graphite.

Generally speaking, the plates (walls) should be thick enough to spread out (uniformize) the power from the TEC's, without sacrificing responsiveness. Too thin, and the effects of the TEC's would be evident, manifest as hot spots. Too thick, and the blackbody would become less responsive, taking longer to reach the set point and stabilize.

Generally, extended area blackbodies have a gradient between the temperature of the surface and the well temperature. A typical magnitude of this gradient would be about 1-2% of the temperature difference between the air in the surrounding environment and the well, depending, in part, on the position of the well, relative to the surface, the source plate material and the coating used on the surface. For example, a 100° C. blackbody in a 25° C. environment might have a 98.5° C. surface temperature.

Some Variations May Include:
- the cavity BB (enclosure) could be any shape, though flat surfaces on the outside may be preferred to interface with the thermoelectric coolers used for temperature control. For example, the enclosure may be rectangular prismatic, cuboid, and prisms having more than four sides
- Paint may be used instead of CNTs on the back surface. While not as ideal as the CNTs, the painted surface still has a significant benefit over a standard, painted, extended area blackbody.

According to another embodiment of the invention (FIG. 3), a heated surface in the form of a ledge or ramp may be disposed in front of (and immediately below) a source plate, and heated along with the source plate to minimize nonuniformity due to convection in front of the source plate. For a minimal implementation, resistive heaters may be used for both the main emitter and the heating ledge below it. Optionally, another surface (in the form of a ledge or ramp) may be disposed in front of and immediately above the source plate for a system where cooling the emitting surface below ambient is desired, and the top ledge will cool the air to help reduce nonuniformity induced by downward convective currents. For the cooling implementation TECs may be used, or a resistive heater in conjunction with another cooling mechanism, such as a liquid heat exchanger. The angles of the top and bottom ledge heaters/coolers can be adjusted to optimize the best uniformity for a particular implementation.

The ledge(s) may be controlled in unison (so to speak) with the source plate. Alternatively, for very large temperature ranges, the ledges may have independent temperature control from the emissive surface (source plate).

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGS.). The figures may generally be in the form of diagrams. Some elements in the figures may be stylized, simplified or exaggerated, others may be omitted, for illustrative clarity.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Some elements may be referred to with letters ("AS", "CBR", "CF", "MA", "MT", "TCM", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and may collectively (all of them at once) referred to simply by the numeral ("310").

The following figures may be referred to and/or described in the text.

Figure 1:
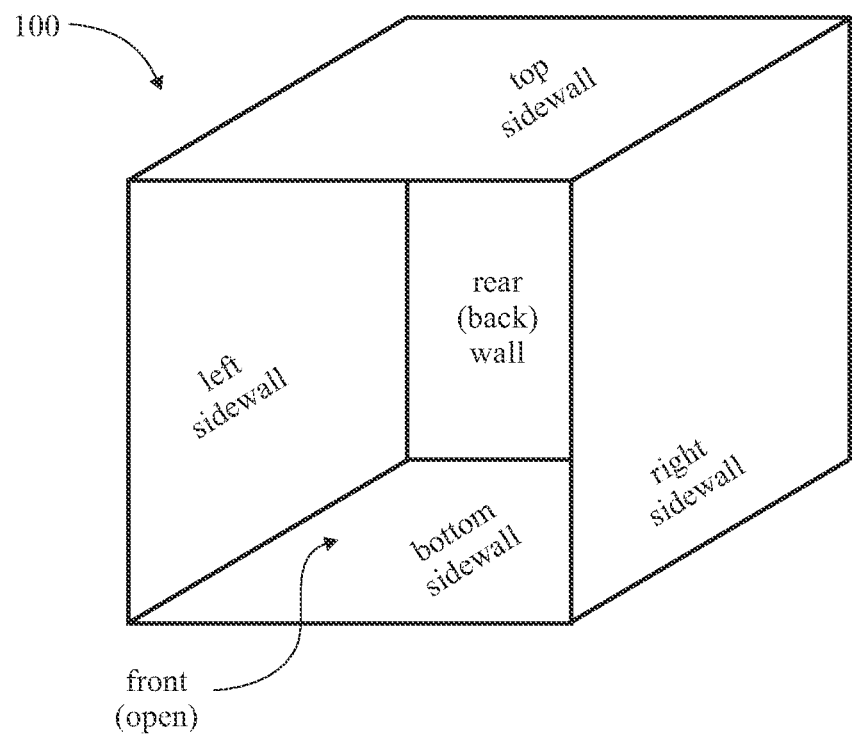

FIG. 1 is a perspective view of an improved extended area blackbody (BB), in the form of an open-ended cube, according to an exemplary embodiment of the invention.

Figure 2:
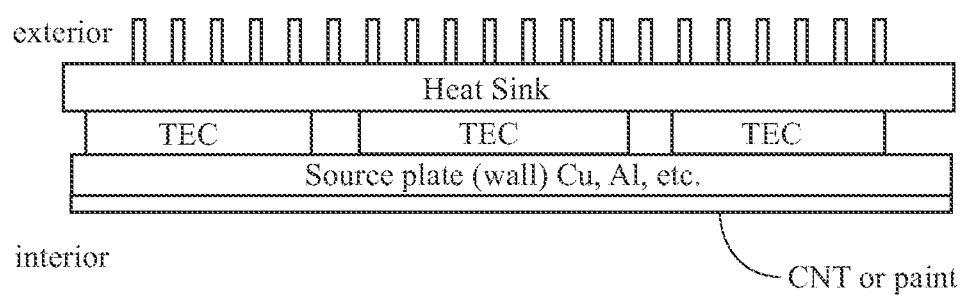

FIG. 2 is a cross-sectional view of an exemplary sidewall or back wall of the extended area blackbody (BB) of FIG. 1.

Figure 3:
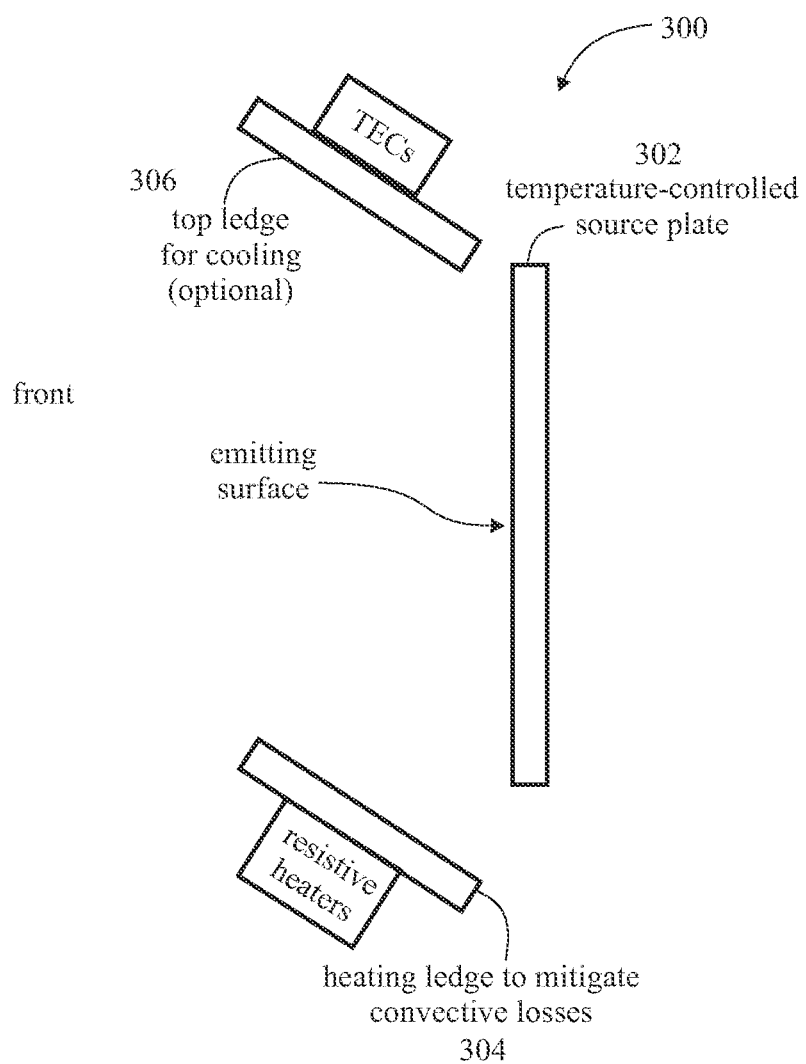

FIG. 3 is a diagram of an improved extended area blackbody using a ledge heater in front of the source plate, and optionally a top ledge for cooling, according to an exemplary embodiment of the invention.

Figure 4:
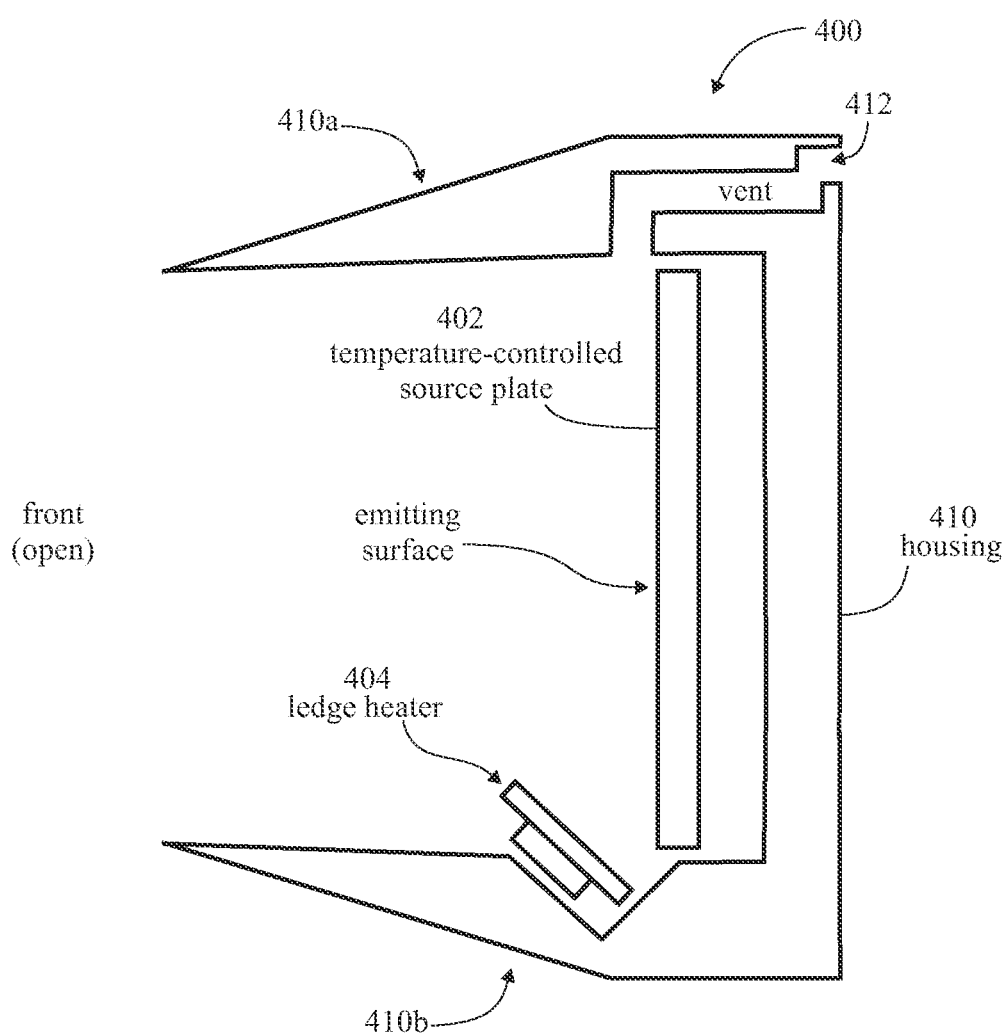

FIG. 4 is a diagram of an improved extended area blackbody using a ledge heater in front of the source plate, and with a vent above the source plate, according to an exemplary embodiment of the invention.

DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein.

Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

FIG. 1 illustrates a box-like enclosure 100, forming a cavity or well. The enclosure may be in the form of a cube, or another rectangular solid having straight walls, for example rectangular prismatic, cuboid, or hexagonal prismatic.

The exemplary enclosure has four (4) side walls (left, right, top, bottom), and a rear (back) wall. A front of the enclosure may be open, or may be partially enclosed, with an opening. The enclosure thus resembles an open box.

The front is open so that an IR Camera or other sensor is able to "stare" into the open end and view the back plate (rear wall). Since the surface temperature is so close to the well temperature and the emissivity is nearly 1 (should be well over 99% with CNTs), then the thermal emission should closely follow the ideal Planck function.

Source plate assemblies may be mounted to the four (for example) side walls, and to the back (rear) wall. A source plate assembly may comprise a source plate, thermoelectric modules, or other temperature control device, such as a resistive heater, and a heatsink. See, for example, a typical single-plate extended area blackbody source, such as the SBIR Infinity line: (https://sbir.com/blackbodies/)

The thermally conductive walls, with thermoelectric modules and heat sinks in place thus become, in effect, source plates.

An interior surface of the side walls may be coated with a high-emissivity material, such as black paint, or may be coated with carbon nanotubes (CNT). The interior surface of the back (rear) wall may be coated with carbon nanotubes, or may also be coated with paint.

The side walls and back (rear) wall may preferably be flat, to accommodate mounting thermoelectric modules (TEM) to the exterior surface thereof. Thermoelectric modules (TEM) may be mounted to the sidewalls and to the back wall to heat and cool the enclosure to a controlled temperature. The individual sidewalls and back wall may be individually controlled with control electronics (not shown, well known).

Note: Thermoelectric, or Peltier Cooling Modules (also known as a TEC or a TEM) come in a wide variety of types and sizes. While typically used for cooling, they can also be used for heating (by reversing the electric current flow) and even for power generation.

Alternatively, the back wall may be curved, or conical, and may not have thermoelectric modules (TEM) mounted to its exterior surface.

The back plate (wall) interior surface may be modified to geometrically increase its effective emissivity, through the use of grooves, microcavities and the like. Such geometries reduce reflectance, but usually look worse than a flat plate due to variations in the surface temperature of the grooves, etc. The air-heating effect of the cavity may make those surface geometries more attractive.

Note that although shown as a cube in FIG. 1, the embodiment does not have to be in the shape of a regular prism. The side walls may be smaller than the back wall may be rectangular or some other shape as dictated by use-case requirements. For example, circular and rounded-rectangle blackbodies are in use and such shapes of the back wall can be used in conjunction with the inventions described herein to improve their radiometric performance.

FIG. 2 illustrates, in cross-section, an exemplary side wall, or back wall, showing (in order, from exterior to interior), a heat sink,
thermoelectric modules (TEM's, or TEC's), alternatively, resistive heaters may be used instead of thermoelectric heaters
the exemplary wall (which functions as a source plate), and
a coating of carbon nanotubes (CNT) or paint on the interior surface thereof.

The temperature of the sidewalls may be maintained (e.g., by the TEM's or resistive heaters) to be the same as one another. The temperature of the back wall may be maintained (e.g., by the TEM's or resistive heaters) to be the same as, or different than the temperature of the sidewalls.

Another Embodiment

Many blackbodies have their uniformity limited by convective losses from their front surface. This is particularly true for inexpensive blackbodies with thin source plates.

According to an embodiment of the invention, losses can be limited by heating the air below (and in front of) the source place such that it is comparable (substantially equal) to the plate temperature as it rises (increases), thus limiting heat exchange between the air and the surface.

FIG. 3 is a diagram of an extended area blackbody 300 using a ledge heater disposed in front of a source plate, according to an exemplary embodiment of the invention.

A temperature-controlled source plate 302, comparable to the back wall of the black body shown in FIG. 1, has an emitting surface (left, as shown), and may be comparable to the source plate arrangement shown in FIG. 2.

A ledge heater 304, which is another heated plate, may be disposed in front of (to the left, as shown) and generally below the temperature-controlled source plate 302, and may be comparable to the source plate arrangement shown in FIG. 2.

The ledge heater 304 does not need to be separately controlled. It can be connected and controlled in series with the heater in the source plate.

The ledge heater 304 area, power and angle may be adjusted to provide good uniformity over a range of temperatures.

By using the ledge heater 304 in conjunction with the source plate 302, as shown, nonuniformity (NU) may be reduced significantly, such as by a value of 3× or more!

Resistive heaters may be used to control the temperature of the ledge heater.

Another ledge plate (top ledge) 306 may be used for cooling, in conjunction with thermoelectric modules (TEM's, or TEC's; not shown), and may be disposed in front of and generally above the temperature-controlled source plate 302.

Using the ledge heater 304 in conjunction with the source plate, as shown, may be considered to be a simple, and lower-cost step towards the concept disclosed in FIG. 1, both of which may be concerned with reducing errors due to convection.

A noticeable difference between the "simple" blackbody 300 of FIG. 3 and the cavity-like extended area blackbody 100 of FIG. 1 is that the "simple" blackbody 300 does not have four sidewalls. In fact, it may have essentially no sidewalls, only the aforementioned lower ledge heater 304 and upper ledge plate 306. More particularly, the "simple" blackbody illustrated in FIG. 3 may only have a source plate (comparable to the rear wall of the blackbody in FIG. 1) and a small bottom sidewall (in the form of a ledge), without having a left, right or top sidewall (compare FIG. 1), and may be implemented as a heat-only blackbody with a resistive heater instead of TECs.

Optionally, the top ledge (comparable to the top wall of the blackbody in FIG. 1), may be incorporated (with TECs) for cooling, or ledges at both the top and bottom may be used for implementations where it is desirable to have a source that can be controlled both above and below the ambient air temperature.

In other words, for a heat-only blackbody, an upward-tilted ramp or ledge is provided at the bottom of the source plate (back wall) to heat the air in front of the source plate in order to reduce nonuniformity from convection. Convection will still be there, but the air at the bottom is heated so that it is at approximately the same temperature as the source plate as it (the heated air) flows up the surface. As shown, the heating ledge 304 is tilted (inclined) upward from its right (as viewed) side, adjacent the source plate/emitting surface 302 towards the front of the "simple" blackbody 300. The upper ledge plate 306 may similarly be tilted from its right (as viewed) side, adjacent the source plate/emitting surface 302 towards the front of the "simple" blackbody 300, and may (or may not) be parallel to the lower heating ledge 304.

Many blackbodies have their source plates recessed to help reduce the effects of external air currents. When using a lower ledge heater, a passage can be created at the top of the source plate in order to prevent hot air from pooling at the top of the source plate. This passage can be made slightly convoluted such that air currents near the exit do not have a direct path to the source plate, and thus help improve the stability and uniformity of the blackbody.

FIG. 4 is a diagram of simple blackbody 400, comparable to the "simple" blackbody 300 of FIG. 3, and similarly uses a ledge heater 404 (compare 304) disposed in front of the source plate 402 (compare 302).

In this embodiment, the blackbody 400 is shown having a housing 410 supporting the source plate 402 and ledge heater 404. There is no top ledge (compare 306) for cooling. Rather, a vent 412 is provided in the housing, in front of and at the top of the source plate/emitting surface 402 to prevent hot air from pooling in the housing at the top of the source plate 402—in other words, to allow air heated by the lower ledge heater 404 and passing by the front of the emitting surface to escape the housing 410.

Note that the housing 410 is shown as having only a top wall 410a and a bottom wall 410b. It should be understood that the housing 400 may additionally have two (left and right) sidewalls, in a manner similar to that of the cavity blackbody 100 shown in FIG. 1, though the sidewalls are not always required.

APPENDIX

Enclosed herewith, and forming part of the disclosure hereof is a document entitled "Nightingale Body Temperature Reference". As disclosed therein:

Santa Barbara Infrared's Nightingale Body Temperature Reference (BTR) blackbody systems provide a stable, uniform, low cost and simple to operate thermal source for human body temperature detection. Nightingale sources are primarily designed to be incorporated into thermal imaging body temperature screening systems. They work by providing a viewable thermal reference area for Infrared camera systems. The Nightingale BTR source features "set and forget" configuration. An operator simply configures the reference source through the USB interface and stores the set point into non-volatile memory. After configuration, the blackbody will automatically control to the set point upon each power up. A status LED visually indicates when the reference is stable and ready for use as a calibration source. The Nightingale's performance has been optimized for a range of absolute temperature set points and ambient conditions that are required by most body temperature screening systems.

Various technical specifications for the Nightingale Body Temperature Reference are set forth therein.

While the invention(s) may have been described with respect to a limited number of embodiments, these should not be construed as limitations on the scope of the invention(s), but rather as examples of some of the embodiments of the invention(s). Those skilled in the art may envision other possible variations, modifications, and implementations that are also within the scope of the invention(s), and claims, based on the disclosure(s) set forth herein.

What is claimed is:

1. Improved extended area blackbody comprising:
   a source plate having a front emitting surface; and
   a bottom ledge element disposed in front of and below the source plate for heating air in front of the source plate.

2. The blackbody of claim 1, further comprising:
   a thermoelectric module or a resistive heater associated with the bottom ledge element.

3. The blackbody of claim 1, further comprising:
   a top ledge element disposed in front of and above the source plate for cooling air in front of the source plate.

4. The blackbody of claim 3, further comprising:
   a thermoelectric module associated with the top ledge element.

5. The blackbody of claim 3, wherein:
   an angle of the top ledge element is adjustable to optimize the best uniformity for a particular implementation.

6. The blackbody of claim 3, wherein:
   for very large temperature ranges, the top ledge has independent temperature control from the emissive surface (source plate).

7. The blackbody of claim 1, wherein:
an angle of the bottom ledge element is adjustable to optimize the best uniformity for a particular implementation.

8. The blackbody of claim 1, wherein:
the bottom ledge element heater is not separately controlled from the source plate.

9. The blackbody of claim 1, wherein:
for very large temperature ranges, the bottom ledge has independent temperature control from the emissive surface (source plate).

10. The blackbody of claim 1, further comprising:
a housing supporting the source plate and bottom ledge element; and
a vent disposed in the housing at a top of the source plate to prevent hot air from pooling there.

11. The extended area blackbody of claim 1, further comprising:
a top ledge element disposed in front of and above the source plate for cooling air in front of the source plate; and
a thermoelectric module associated with the top ledge element;
wherein an angle of the top ledge element is adjustable.

12. The extended area blackbody of claim 11, wherein:
the bottom and top ledges have independent temperature control from the emissive surface (source plate).

13. Extended area blackbody comprising:
a source plate having a front emitting surface;
a bottom ledge element disposed in front of and below the source plate for heating air in front of the source plate; and
a thermoelectric module or a resistive heater associated with the bottom ledge element;
wherein an angle of the bottom ledge element is adjustable.

14. The extended area blackbody of claim 13, further comprising:
a housing supporting the source plate and bottom ledge element; and
a vent disposed in the housing at the top of the source plate.

* * * * *